Aug. 4, 1959           G. SELIG           2,897,928
COUPLERS FOR CAMERA ATTACHMENTS OR THE LIKE
Filed Feb. 15, 1956
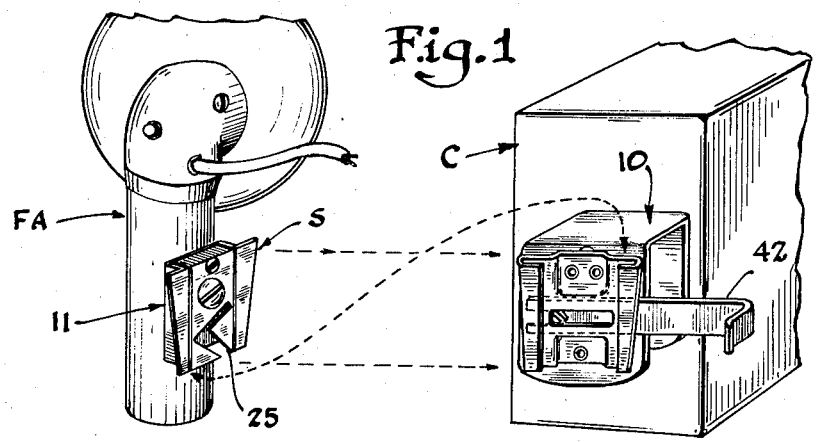
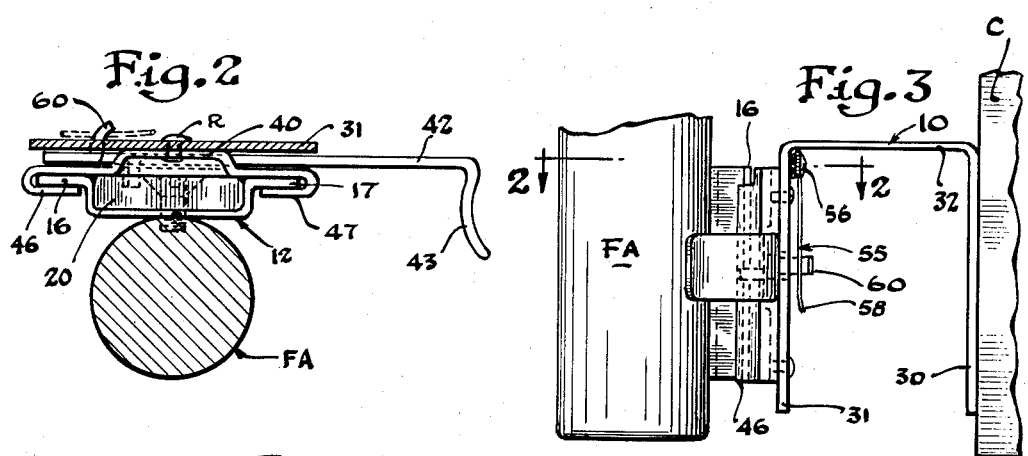
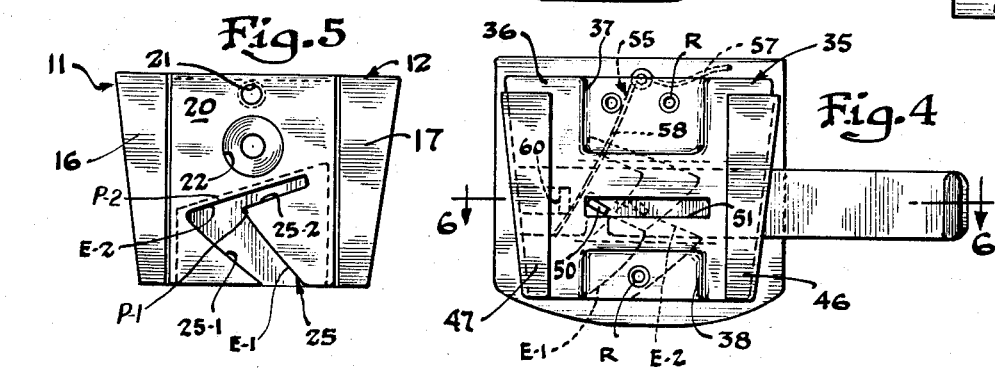
Inventor
Guenther Selig
By Wallace and Cannon
Attorneys United States Patent Office 2,897,928
Patented Aug. 4, 1959

2,897,928
COUPLERS FOR CAMERA ATTACHMENTS OR THE LIKE

Guenther Selig, Chicago, Ill., assignor to Remsel Industries, Inc., Chicago, Ill., a corporation of Illinois Application February 15, 1956, Serial No. 565,659

4 Claims. (Cl. 189—36)

This invention relates to a coupler, especially a coupler adapted under one form of the invention to couple an attachment to a camera or the like.

It is advantageous to be able to removably associate a flash or like attachment with a camera in such a way that the camera may be handled without apprehension of the attachment becoming loose, and it is also desirable to be able to quickly disassociate the attachment from the camera. The primary object of the present invention is therefore to enable a flash attachment to be quickly and easily associated and disassociated from a camera, and to assure that the associated relation is one wherein the attachment is rigidly connected to the camera.

Specifically, it is the object of the present invention to afford a two-part coupler comprising a bracket and a slide, the arrangement being such that upon associating the slide with the bracket a latch is automatically shifted to a released position and when the slide is fully seated in the bracket the latch is then effective to lock the parts together. When it is desired to unseat the slide from the bracket, the latch is then operated manually toward a released position and as an incident to this the slide is initially cammed out of the bracket and then is forcibly ejected upon further operation of the latch.

Other and further objects of the present invention will be apparent from the following description and claims and are illustrated in the accompanying drawing which, by way of illustration, shows a preferred embodiment of the present invention and the principles thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

Fig. 1 is a perspective view, partly schematic, of a camera and a flash attachment having the respective parts of the coupler of the present invention affixed thereto;

Fig. 2 is a sectional view of the coupler in its coupling position taken substantially on the line 2—2 of Fig. 3;

Fig. 3 is a fragmentary side elevation showing the flash attachment coupled to the camera in accordance with the present invention;

Fig. 4 is a front elevation of the bracket part of the coupler;

Fig. 5 is a rear elevation of the slide part of the coupler; and

Fig. 6 is a sectional view of the bracket substantially on the line 6—6 of Fig. 4.

The present invention, as will be apparent from the description to follow, may be used under many different circumstances for coupling an attachment to a related piece of apparatus or equipment. In the present instance, to illustrate one form in which the invention is manifest, a camera C, Fig. 1, and a conventional flash attachment FA are shown as having affixed thereto the respective parts of the present coupler. Thus, the coupler of the present invention comprises what constitutes a bracket 10 and a slide 11. The slide 11 embodies a plate 12, Figs. 2, 5 and 6, and it will be observed that in horizontal section the plate 12 is U-shaped so as to include a pair of opposed vertical legs 13 and 14 and a flat web or bight portion 15 connecting these legs. The edges of the legs 13 and 14 opposite the web 15 are formed with outwardly directed flanges 16 and 17. As shown particularly in Figs. 1 and 5, the flanges 16 and 17 are tapered along their outer vertical edges, and as will be pointed out hereinbelow the flanges 16 and 17 represent holding means adapted to complementally interfit with guide means afforded in the bracket 10.

Disposed in the channel that lies between the legs 13 and 14 of the slide 11 is a block 20, and the block 20 is secured in place as by brazing or the like. The block 20 is provided near the top thereof as shown in Fig. 5 with a tapped opening 21 and countersunk opening 22, and as shown in Fig. 1 these openings are afforded for related screws which serve to removably affix the slide 11 to the flash attachment FA. As shown in Figs. 1 and 5, the rear face of the block 20 is provided with a dual-directional slot 25 having one directional lower leg portion 25–1 of relatively wide width proceeding from the bottom of the block 20 upwardly at an incline in the direction of the flange 16. The other or upper directional leg portion 25–2 of the slot 25 extends from the upper end of the slot 25–1 upwardly at an incline in the direction of the flange 17. Thus, the slot 25 is substantially V-shaped, that is, reverses on itself at a point common to the two slot portions 25–1 and 25–2 and from which point said portions diverge to afford corresponding divergent cam edges, and the purpose of this will be set forth in more detail hereinbelow.

The other part of the coupler, namely the bracket 10 is adapted to be affixed to the other piece of apparatus which is to be coupled, and in this instance this is the camera C as was mentioned. The bracket 10 includes a vertical rear leg 30, may be removably secured to the camera C in any desired manner, preferably by screws or the like passed through openings in the rear leg 30.

Riveted to the front leg 31 of the bracket 10 is a plate 35, Fig. 4. The rear wall 36 of the plate 35 is recessed as at 37 and 38 so that the rivets R, Fig. 4, which are used to secure the plate 35 to the front wall 31 to the bracket 10 are disposed in non-projecting relation relative to the front face of the wall 36. The recesses 37 and 38 are afforded by stamping the plate 35, and as shown in Fig. 2 this produces relief spacers as 40 at the back of the plate 35 serving in part to stabilize the plate 35 on the front wall 31 of the bracket 10. The spacers 40 at the same time afford spacing between the front wall 31 of the bracket 10 and the plate 35 so that a lever 42 disposed between the plate 35 and the front wall 31 of the bracket 10 may act freely therebetween as will be described below.

The plate 35 is formed with guide means related complementally to the flanges 16 and 17 of the slide 11. Thus, the opposite side edges of the plate 35 are formed with inwardly directed hook-like flanges 46 and 47, Figs. 4 and 6, and the arrangement is such that the flanges 46 and 47 are tapered complementary to the flanges 16 and 17 and are of substantially the same top-to-bottom length as the flanges 16 and 17 enabling the slide 11 to be fully seated in respect of the guides 46 and 47 as shown particularly in Figs. 2, 3 and 6. The corresponding vertical channels afforded by the flanges 46 and 47 are of course of sufficient depth as shown in Figs. 2, 3 and 6 to enable the flanges 16 and 17 of the slide to fit therein to hold the slide on the bracket.

The bracket 10 supports a spring-urged latch which is operated automatically as an incident to interfitting the slide 11 with the complemental portion of the bracket 10. The latch is also adapted to be operated manually to uncouple the slide 11 from the complemental portion of the bracket 10 with a forced action which is adapted to in effect eject the flash attachment FA or other attachment, and these operations will now be described.

Mention was made above of the lever 42 disposed between the plates 31 and 35 of the bracket 10. It will be observed in this connection that the lever 42 includes at one end a finger piece 43, and this finger piece is configured so that the thumb and forefinger of one hand may be prehensibly applied thereto while the camera is held in the other hand. The lever 42 has a catch 50, Figs. 4 and 6 struck forwardly therefrom at an angle, and this catch projects through a guide slot 51 formed in the plate 35 between the recesses 37 and 38 as shown in Fig. 4. Normally, the catch 50 is disposed in a latching position at one end of the slot 51, this being the left-hand end as viewed in Fig. 4. Such normal position is a yieldable one, and biasing is afforded by a torsion spring 55 which is wrapped about a pin 56 projecting rearwardly from the rear face of the front wall 31 of the bracket 10 as shown in Fig. 3. The upper leg portion 57, Fig. 4, of the spring 55 acts on the lower face of the web 32 of the bracket 10, and the other or lower leg 58 of the spring 55 extends downwardly from the pin 56 and is tensioned against a lug 60, Figs. 4 and 6, which is struck rearwardly from the end of the lever 42 opposite the finger piece 43. The lug 60 extends through a guide slot 61, Fig. 6, that is formed in the front leg 31 in the bracket 10 parallel to and in substantial alignment with the slot 51 in the plate 35. Thus, the spring 55 acts normally to bias the lever 42 with the catch or dog 50 thereof in the normal position shown in Fig. 4, but the lever 42 can be pulled manually to the right as viewed in Fig. 4 to advance the catch 50 in a right-hand direction toward the other end of the slot 51.

It was mentioned that the catch 50 is disposed at an angle, that is, is inclined to the horizontal as viewed in Fig. 4. The cam slot 25 in the slide 11 is configured so that when the slide 11 is slidably interfitted in the guide channel of the bracket 10 with the narrow ends of the holding flanges 16 and 17 disposed downwardly as indicated in Fig. 1, the lower open end of the directional portion 25–1 of the cam slot 25 registers with the catch 50 in its normal position. Then, by applying a downward force to the flash attachment or like attachment the edge E–1, Fig. 5, the first directional portion 25–1 of the cam slot 25 engages the left edge of the latch 50, Fig. 4, and cams the latch 50 from left to right as viewed in Fig. 4, and such camming will continue as the slide 11 is further forced downwardly in the complemental guide means of the bracket 10 until the dog 50 is aligned with the lower end of the directional portion 25–2 of the cam slot 25, whereupon the catch 50 is freed of the first cam edge at the apex or common point of the slots 25–1 and 25–2 and enters the portion 25–2 of the cam slot under the return action of the spring 55. This locks the parts together since the slide 11 is seated or disposed in a locking recess represented by the slot portion 25–2 and can not now be removed from the bracket 10 by any upward force applied to the slide 11, and in this connection it is important to point out that the angle of the catch or dog 50 corresponds to the angle of the cam edge 25–2 as indicated by dotting in of the cam slot 25 in Fig. 4. However, by applying further downward force to the slide 11 the dog 50 then travels under the action of its spring 55 from the lower to the upper end of the cam slot 25–2, and the parts 10 and 11 of the coupler are fully seated.

To release or unseat the parts 10 and 11, the lever 42 is pulled to the right as viewed in Fig. 4, and it will be appreciated that the catch 50 is then caused to travel along a truly horizontal line. Since the cam edge 25–2 is inclined, the dog 50 wedgingly engages the edge E–2 of the directional portion 25–2 of the cam slot 25, and the consequence is that at this time the slide 11 is forced upwardly to an unseated position. When the catch 50 is in its right hand or released position as viewed in Fig. 4, the slide 11 may be removed from the coupler 10. This subsequent unseating of the slide 11 under the present invention may, however, be one of actual ejection. Thus, when the slide 11 is initially unseated with the catch 50 at the lower end of the slot 25–2 and in alignment with the outer portion 25–1 of the cam slot, the slide 42 may then be pressed inwardly to the left as viewed in Figs. 1 and 4 causing 50 to forcibly engage edge E–1 of the slot 25–1, and because of the direction of the slot 25–1 the slide 11 is ejected forcibly upwardly. Thus it will be observed in Figs. 4 and 5 that the lower cam edge E–1 is substantially normal to the upper cam edge E–2. The upper end of edge E–1 terminates short of edge E–2 to allow free passage of the catch 50, and the cam edge E–1 slopes downward from a point P–1 adjacent the approximate midpoint P–2 of the cam edge E–2.

It will thus be seen that under the present invention there is afforded a coupler having one part formed with a catch and another part formed with a cam slot or edge so configured that by slidably engaging the parts of the coupler the catch is automatically actuated from a normal latching position to a released position. The catch is adapted to be actuated manually to uncouple the parts automatically as a consequence of the relation between the catch and the aforesaid cam edge, and after initial unseating the one part of the coupler may be ejected forcibly. While the invention has been described in connection with a camera and conventional flash attachment, the invention obviously has utility in other arrangements. Exemplary of another use is to hold to a camera the lamp support described in my co-pending application Ser. No. 552,075, now Patent No. 2,839,321, filed December 9, 1955.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A coupler of the kind described and comprising a pair of parts respectively formed with a guide means and a holding element complementally interfitted and coupling the parts securely together, one of said parts being provided with a spring-urged catch movable along a linear path between latching and releasing positions and the second of said parts being formed with one sloping cam edge engaging the catch in the latching position of the catch, said second part being formed with a second sloping cam edge engageable by the catch in its releasing position, and said cam edges converging one relative to the other in a direction proceeding toward the released position of the catch, said second cam edge also being engageable with the catch in its latching position.

2. A coupler according to claim 1 wherein, when the parts are disposed in an upright position with the catch movable along a linear path from a left-hand latching position to a right-hand releasing position, the first cam edge is in an upper position and the second cam edge is in a lower position, with the first cam edge sloping downward proceeding from left to right with the second cam edge sloping downward from right to left.

3. A coupler according to claim 2 wherein the cam edges are provided by a V-shaped cam slot having upper and lower leg portions in the part having the two cam edges and wherein the lower leg of the cam slot opens at the bottom of such part and slopes upwardly to the right joining the upper leg portion with the upper leg portion sloping upwardly to the left, and wherein the catch is adapted to slide in said slot when the part having the slot is moved vertically.

4. A coupler of the kind described and comprising a pair of parts respectively formed with a guide means and a holding element complementally interfitted and coupling the parts securely together, one of said parts being provided with a spring-urged catch movable along a linear path between latching and releasing positions and the second said parts being formed with one sloping cam edge engaging the catch in the latching position of the catch, said second part being formed with a second sloping cam edge engageable by the catch in its releasing position, and said cam edges converging one relative to the other in a direction proceeding toward the released position of the catch, said second cam edge also being engageable with the catch in its latching position and being disposed approximately normal to the first cam edge, the second cam edge terminating at a point spaced from the approximate midpoint of the first cam edge.

References Cited in the file of this patent

UNITED STATES PATENTS

| | | |
|---|---|---|
| 1,069,693 | Hay | Aug. 12, 1913 |
| 1,246,749 | Joiner | Nov. 13, 1917 |
| 2,369,336 | Cable | Feb. 13, 1945 |
| 2,454,681 | Wollin | Nov. 23, 1948 |